March 6, 1973     W. C. HOWARD     3,719,438

ROTATING PISTON ENGINE

Filed Nov. 30, 1970     3 Sheets-Sheet 1

William C. Howard
INVENTOR.

March 6, 1973　　　W. C. HOWARD　　　3,719,438
ROTATING PISTON ENGINE
Filed Nov. 30, 1970　　　　　　　3 Sheets-Sheet 2
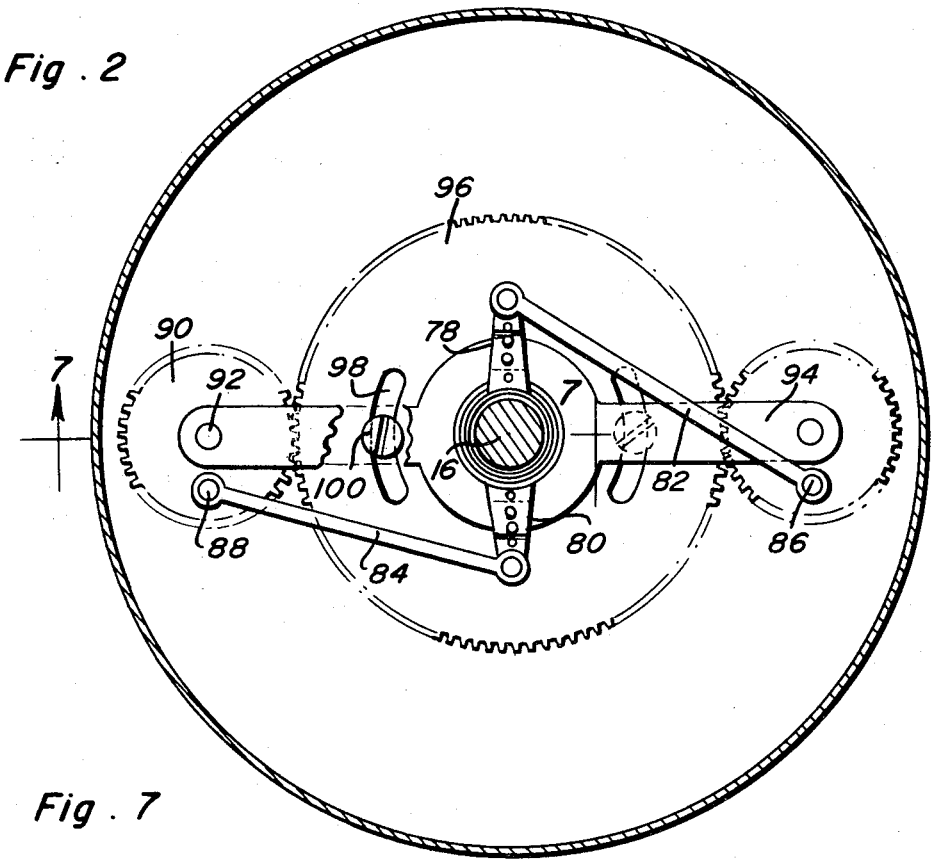
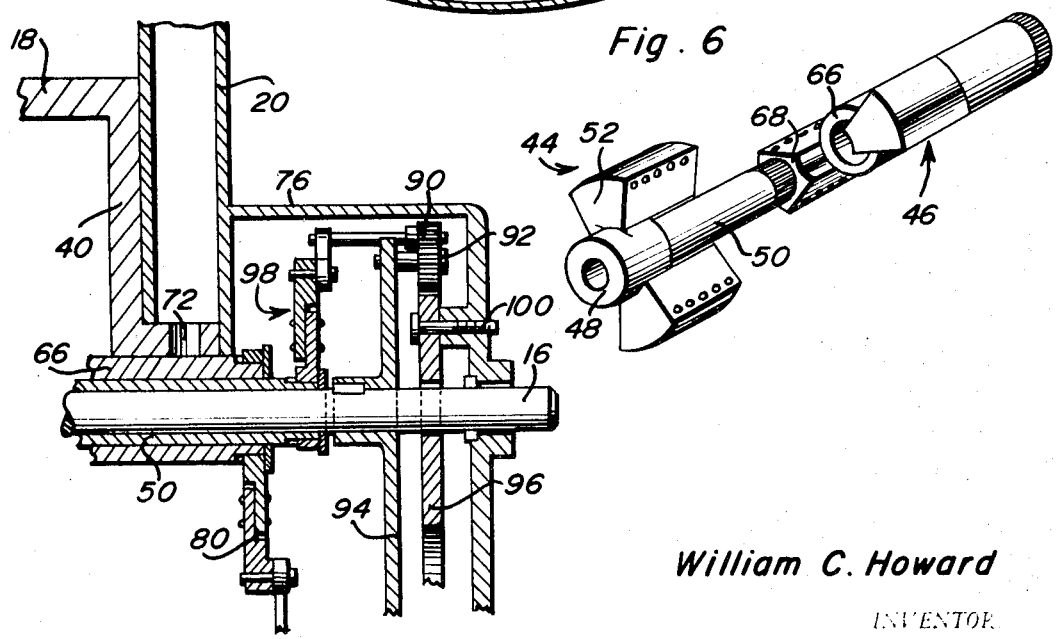
William C. Howard
INVENTOR March 6, 1973 W. C. HOWARD 3,719,438
ROTATING PISTON ENGINE
Filed Nov. 30, 1970 3 Sheets-Sheet 3
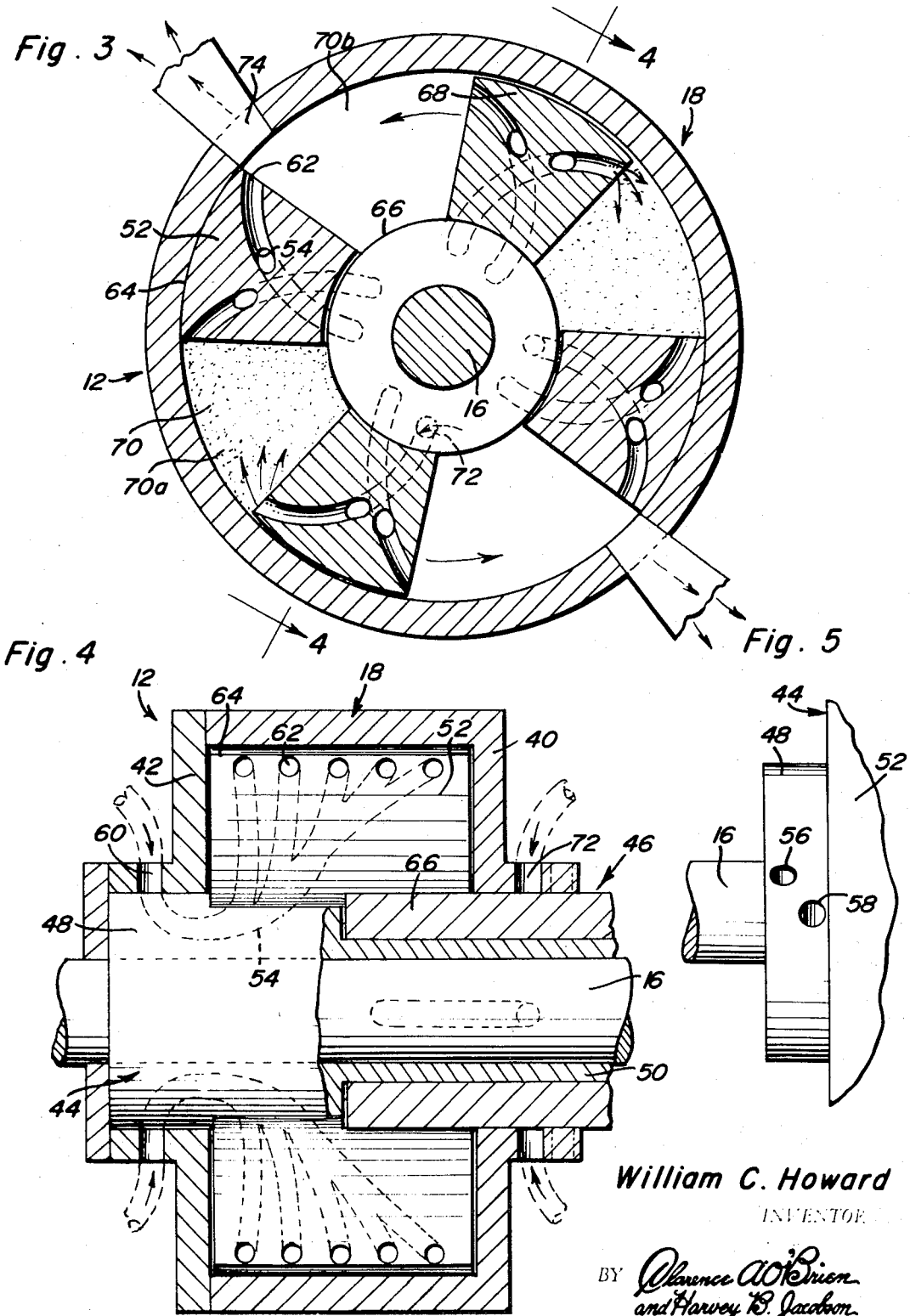
William C. Howard
INVENTOR
BY Clarence A. O'Brien
and Harvey B. Jacobson
Attorneys ย
United States Patent Office 3,719,438
Patented Mar. 6, 1973

3,719,438
ROTATING PISTON ENGINE
William C. Howard, P.O. Box 638, Olden, Tex. 76466
Filed Nov. 30, 1970, Ser. No. 93,745
Int. Cl. F01c 9/00
U.S. Cl. 418—36
6 Claims

ABSTRACT OF THE DISCLOSURE

Heated gas is compressed and expanded in the working chambers formed between piston rotors which oscillate relative to each other while rotating about a drive axis. The gas is conducted into each chamber through the piston vanes and exhausted through radially outer ports in the housing. Movement of the piston rotors is synchronized and adjusted in stroke and phase by gearing to which the output shaft of the engine is connected.

---

This invention relates to expansible chamber devices through which working fluid is recycled and in particular to a power plant having a rotating piston engine.

Considerable interest has recently been revived in power plants employing external combustion type engines in order to avoid pollution. Engines of this type, however, are often large, bulky and heavy in order to meet desired power requirements and are usually noisey in operation. It is therefore an important object of the present invention to provide an engine adapted to receive working fluid which is externally heated and wherein the energy of the working fluid is efficiently converted into motive energy by rotating piston rotors which cyclically oscillate relative to each other in order to cause compression and expansion of working chambers into which the working fluid is received and from which the working fluid is exhausted. An additional object in accordance with the foregoing object is to provide such an engine that is relatively compact and lightweight and requires a minimum amount of maintenance.

In accordance with the present invention, at least two piston rotors oscillate relative to each other about a common drive axis as they are continuously rotated in the same direction about this axis by a gear train which operatively interconnects the piston rotors and an output shaft of the engine. Passages formed in each of the piston rotors conduct heated gas from an external source into working chambers formed between the piston vanes in order to impart relative angular movement to the piston rotors as they are rotated in the same direction about the engine output shaft to which the rotors are drivingly connected through a planetary gear and linkage system. The passages in the piston rotors accordingly communicate with inlet ports during intake phases of each rotational cycle causing the working chambers to expand. During exhaust phases, the working chambers are in fluid communication with outlet ports in the radially outer portion of the housing enclosing the working chambers between the piston vanes. The piston vanes associated with each of the piston rotors, are angularly spaced on rotor hubs which are compactly assembled. The arrangement is such as to reduce vibration and simplify lubrication.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged sectional view taken substantially through a plane indicated by section line 2—2 in FIG. 1 showing the planetary gear and linkage system of the power plant.

FIG. 3 is a transverse sectional view through the power plant engine taken substantially through a plane indicated by section line 3—3 in FIG. 1.

FIG. 4 is a partial sectional view taken substantially through a plane indicated by section line 4—4 in FIG. 3.

FIG. 5 is a partial side elevational view of a portion of the engine illustrated in FIG. 4.

FIG. 6 is a perspective view showing the disassembled piston rotors associated with the engine of FIG. 1.

FIG. 7 is a partial sectional view taken substantially through a plane indicated by section line 7—7 in FIG. 2.

Figure 1:
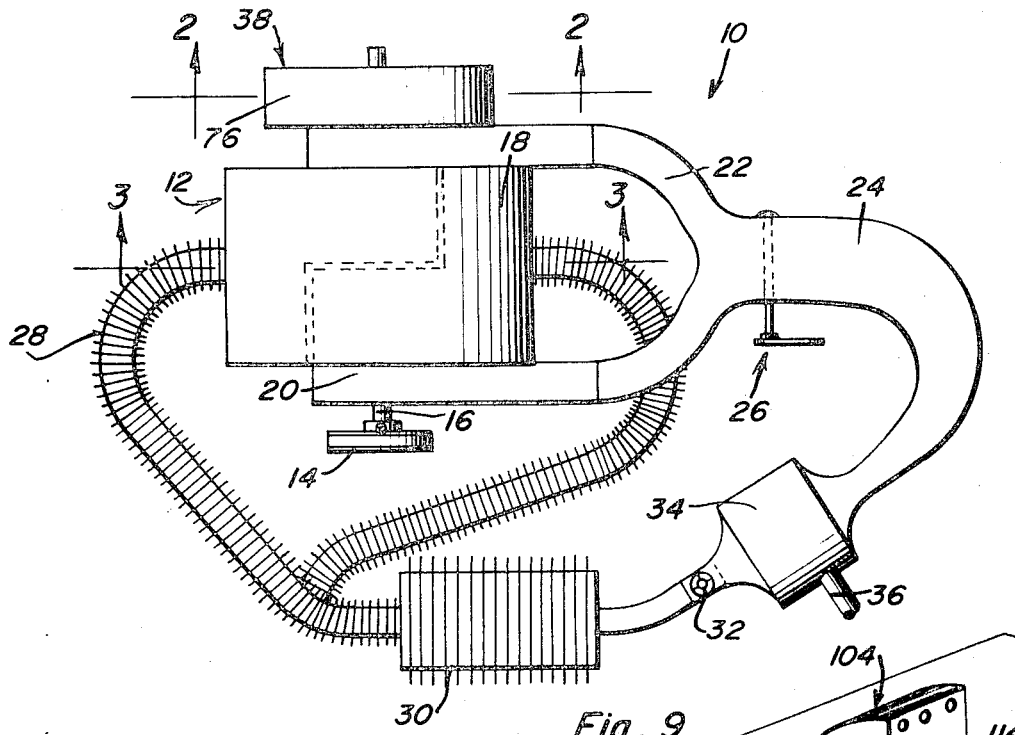
FIG. 1 is a somewhat simplified plan view of a power plant constructed in accordance with the present invention.

Referring now to the drawings in detail, FIG. 1 illustrates a power plant constructed in accordance with the present invention generally denoted by reference numeral 10. The power plant includes an engine 12 from which motive energy is delivered to a driven member such as a pulley wheel 14 connected to the main output engine shaft 16. The engine includes a main housing 18 from which the output shaft 16 extends. Connected to the housing 18 on either side thereof, are a pair of intake manifolds 20 interconnected by the branch conduits 22 to a supply conduit 24. Thus, hot gases are conducted through the conduit 24 to the engine as its working fluid. An engine speed control valve mechanism 26 regulates the quantity of working fluid supplied to the engine. The working fluid is exhausted from the engine through a pair of externally finned, exhaust conduits 28.

In one form of the invention, the working fluid exhausted from the engine is conducted to an exhaust gas storage tank 30 from which the exhaust gases may be conducted through a one-way check valve 32 to a heater 34 within which combustion of a fuel mixture may take place. Accordingly, a controlled supply of fuel may be fed to the heater 34 through the fuel supply conduit 36.

Also associated with the engine 12, is a gear and linkage control assembly generally referred to by reference numeral 38, the details of which will be described hereafter. This control assembly 38 is operative to control the stroke and phase of the relatively moveable parts of the engine. Accordingly, timing and compression ratio adjustments are possible through the control assembly 38.

Referring now to FIGS. 3, 4 and 6, the engine 12 encloses a generally cylindrical chamber within the housing 18 which is provided with axially spaced end walls 40 and 42. The engine output shaft 16 extends concentrically through the housing 18 for rotation relative thereto and rotatably mounts thereon a pair of piston rotors generally referred to by reference numerals 44 and 46. The piston rotor 44 includes a hub portion 48 from which a tubular shaft 50 extends in one axial direction. At least two segmental vane portions 52 project radially from the hub portion 48 in 180 degree relationship to each other. Extending through the hub portion 48 of the piston rotor, are a pair of passages 54 associated with each of the vane portions 52. Each pair of passages 54 terminates at inlet openings 56 and 58 axially spaced from the vane portions 52 as more clearly seen in FIG. 5. By proper adjustment of the engine, working fluid supplied through inlet port 60 in the housing 18 will flow through either inlet opening 56 or 58 depending upon the direction of rotation in which the engine is being motivated. Thus, the passages 54 associated with the inlet openings 56 and 58 will conduct working fluids for discharge from a plurality of outlet openings 62 disposed on opposite pressure faces of each vane portion 52 adjacent the radially outer surface 64 which is in wiping engagement with the internal surface of the housing 18.

The other piston rotor 46 is similar in construction to the piston rotor 44 in that it includes a hub portion 66 that extends axially in one direction beyond the pair of piston vanes 68 associated with the piston rotor 46. The piston vanes 68 are spaced 180 degrees relative to each other and are interfitted between the piston vanes 52 associated with the piston rotor 44. Accordingly, the piston vanes 52 project axially over the hub portion 66 of the piston rotor 46 while the piston vanes 68 of the piston rotor 46 project axially over the hub portion 48 of the piston rotor 44 in order to compactly occupy the space enclosed by the housing 18 between the end walls 40 and 42. Expansible and contractible working chambers 70 are formed between the piston vanes 52 and 68 into which working fluid is discharged from the outlet openings 62 on the pressure faces of the piston vanes.

As shown in FIG. 3, a pair of working chambers 70A are being supplied through inlet ports 72 with working fluid emerging from one face of the piston vanes 68. Expansion of the chamber 70A accordingly occurs in order to cause angular movement of the piston rotors relative to each other resulting in contraction of the other pair of working chambers 70B from which working fluid is exhausted through radially outer exhaust ports 74 in the housing 18 with which the chambers 70B are in communication as shown in FIG. 3. At the same time that the piston rotors and the vanes 52 and 68 are undergoing angular movement relative to each other, they are also being rotated in the same rotational direction. By appropriately synchronizing this rotational movement of both piston rotors with their relative angular movement in opposite directions, the intake and exhaust phases for the two pairs of working chambers may be properly timed for fluid communication of the chambers and passages 54 with the inlet ports 60 and 72 and with the exhaust ports 74. Control over the relative movement and motion of the piston rotors for this purpose is achieved by means of the control assembly 38 aforementioned.

Referring now to FIGS. 2, 6 and 7, the hub portion 66 of piston rotor 46 and the tubular portion 50 of piston rotor 44 extend into the housing portion 76 enclosing the control assembly 38. Splined to the end of the tubular portion 50 of piston rotor 44, is a radially adjustable arm 78. Similarly, a radially adjustable arm 80 is splined to the end of the piston rotor hub 66 in close axially spaced relation to the arm 78. The radially outer ends of the arms 78 and 80 are pivotally connected to connecting rods 82 and 84, the opposite ends of which are connected by crank pins 86 and 88 to a pair of planetary pinion gears 90. Each of the planetary pinion gears 90 are rotatably mounted by pinion shafts 92 on a carrier 94 which is splined to the engine output shaft 16. Further, the planet pinion gear 90 are in mesh with a stationary sun gear 96 which is adjustably fixed to the housing 76. The sun gear 96 may therefore be provided with arcuate slots 98 through which it is clamped to the housing by adjustment screws 100 in an angularly adjusted position.

It will be apparent, that relative angular movement is imparted to the piston vanes by introduction of the working fluid as aforementioned to produce corresponding movement of the arms 78 and 80 resulting in angular movement of the planet pinion gears 92 to which the arms are connected by the connecting rods 82 and 84. Thus, as the arms 78 and 80 oscillate toward and away from each other, the pinion gears 90 rotate in one direction in view of the crank connection of the connecting rods to the pinion gears through the crank pins 86 and 88. As the pinion gears 90 rotate, they walk around the stationary sun gear 96 producing rotation of the carrier 94 on which the pinion gears are rotatably mounted. Thus, the arms 78 and 80 are rotated in the same direction by the carrier as they oscillate relative to each other. The carrier 94 being splined to the output shaft 16 produces rotation of the output shaft. By adjusting the length of the arms 78 and 80, the oscillatory stroke of the piston vanes may be varied as desired. The timing or the phase of the piston vane movement on the other hand may be regulated by angularly adjusting the position of the stationary sun gear 96. In this fashion, not only timing or phase is adjustable but also the direction of rotation may be selected because of the pair of passages associated with each piston vane to control the direction in which fluid is discharged from the pressure faces of the piston vanes.

Figure 9:
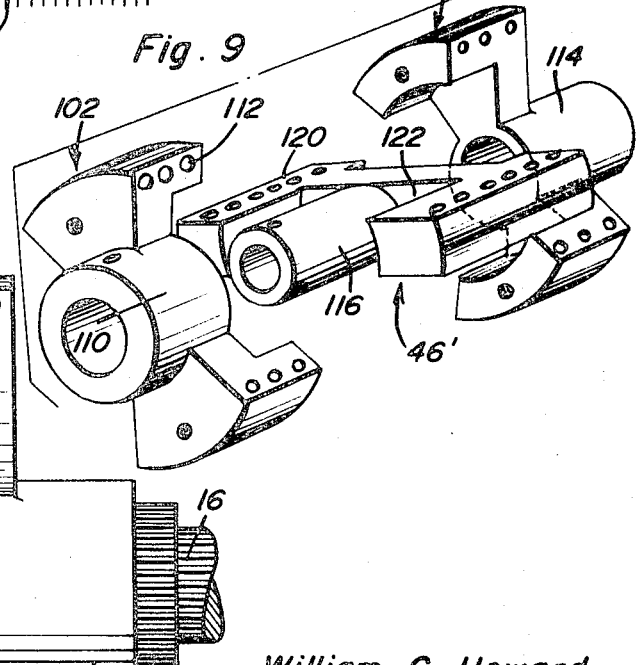
FIG. 9 is a perspective view showing the disassembled piston rotors associated with the engine illustrated in FIG. 8.
Figure 8:
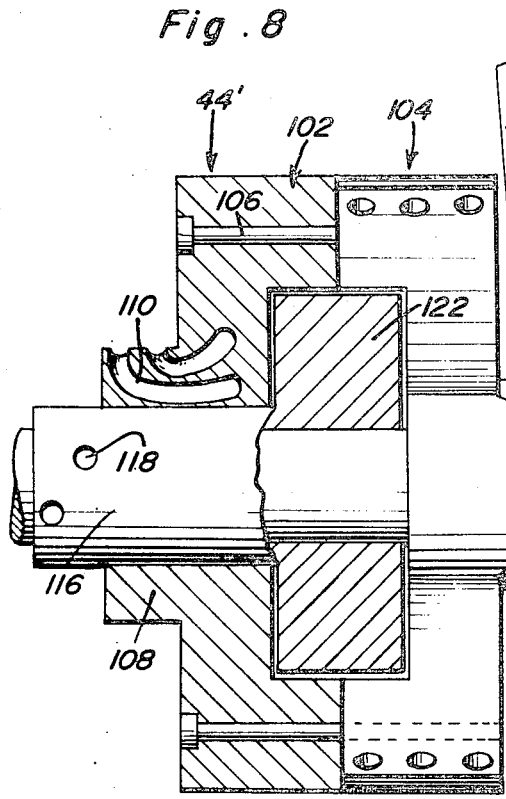
FIG. 8 is a sectional view similar to FIG. 4 but showing a modified engine construction.

FIGS. 8 and 9 illustrate an engine in which a modified piston rotor construction is utilized. In this form of engine, one of the piston rotors 44' includes two sections 102 and 104 which are secured to each other by assembly bolts 106 extending through the vane portions. The vane portions associated with piston rotor section 102 project radially from a hub portion 108 within which passages 110 are provided for conducting the working fluid to the outlet openings 112 on the side faces of the vane portions. A hub portion 114 also extends from the vane portions associated with the rotor section 104 for connection to the control assembly 38 as aforementioned. Axially disposed between the sections 102 and 104 of the piston rotor 44', is the other piston rotor 46'. The piston rotor 46' includes a tubular hub portion 116 which extends axially through the hub portions 110 and 114 of the piston rotor 44'. A pair of passages 118 also extends through the piston rotor 46' terminating in axially spaced relation to the hub portion 108 of the piston rotor 44'. The piston rotor 46' is also provided with vanes 120 which are angularly spaced between the vane portions of the piston rotor sections 102 and 104 and are radially spaced from and connected to the hub portion 116 by posts 122. Thus, a compact and efficient assembly of piston rotors is formed. The operation of the piston rotors 44' and 46' is the same as the piston rotors 44 and 46 hereinbefore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fluid chamber device comprising a housing having inlet and outlet ports, a drive member rotatably mounted by the housing for rotation about a fixed axis, at least two rotors rotatably mounted for rotation about said fixed axis, said rotors having pressure faces between which at least two working chambers are formed, passage means within both of said rotors for conducting working fluid between one of said ports and the chambers through said pressure faces and control means drivingly interconnecting the drive member with said rotors for synchronizing cyclic movement of the rotors relative to the drive member while both are undergoing continuous unidirectional rotation.

2. The combination of claim 1 including manifold means for conducting the working fluid to the inlet port, exhaust conduit means connected to the housing for conducting the working fluid from the outlet port and means for recycling the working fluid between the exhaust conduit and manifold means.

3. The combination of claim 2 wherein the recycling means includes combustion means for heating the working fluid.

4. The combination of claim 1 wherein each of said rotors includes a vane portion on which an opposed pair of said pressure faces are formed, said passage means including discharge openings on both of said opposed pair of pressure faces from which the working fluid is discharged into the working chambers, said control means including phase adjustment means for selecting one of said opposed pair of pressure faces from which the working fluid is discharged to determine the direction of rotation of the drive member.

5. A fluid power device comprising a housing, a drive member rotatably mounted by the housing for rotation about a fixed axis, at least two rotors rotatably mounted for rotation about said fixed axis, said rotors having pressure faces between which at least two working chambers are formed, passage means within both of said rotors for discharging working fluid into the chambers from said pressure faces and gear means drivingly interconnecting the drive member with said rotors for imparting unidirectional rotation to the drive member in response to expansion and contraction of said working chambers.

6. The combination of claim 5 wherein each of said rotors includes a vane portion on which an opposed pair of said pressure faces are formed, said passage means including discharge openings on both of said opposed pair of pressure faces from which the working fluid is discharged into the working chambers, and control means operatively connected to the gear means for selecting one of said opposed pair of pressure faces from which the working fluid is discharged to determine the direction of rotation of the drive member.

References Cited

UNITED STATES PATENTS

| | | | |
|---|---|---|---|
| 530,220 | 12/1894 | Delattre et al. | 418—34 |
| 1,095,034 | 4/1914 | Sanchez et al. | 418—36 |
| 1,701,648 | 2/1929 | Wildey | 418—36 |
| 3,144,007 | 8/1964 | Kavertz | 418—36 X |
| 3,584,984 | 6/1971 | Majkowski et al. | 418—187 |
| 1,972,302 | 9/1934 | Hutchison, Jr. | 418—186 |
| 2,620,778 | 12/1952 | Duckworth | 418—36 |
| 2,879,713 | 3/1959 | Pelladeau | 418—187 |

FOREIGN PATENTS

| | | | |
|---|---|---|---|
| 65,932 | 1/1943 | Denmark | 418—36 |

MARTIN P. SCHWADRON, Primary Examiner

A. M. OSTRAGER, Assistant Examiner

U.S. Cl. X.R.

418—183, 188